United States Patent [19]

Heibel et al.

[11] Patent Number: 5,178,441

[45] Date of Patent: Jan. 12, 1993

[54] MOTOR VEHICLE BRAKING SYSTEM

[75] Inventors: Helmut Heibel, Moschheim; Josef Pickenhahn, Plaidt, both of Fed. Rep. of Germany

[73] Assignee: Lucas Industries public limited company, Birmingham, England

[21] Appl. No.: 634,582

[22] Filed: Dec. 27, 1990

[30] Foreign Application Priority Data

Dec. 27, 1989 [DE] Fed. Rep. of Germany ....... 3943002

[51] Int. Cl.$^5$ ............................ B60T 8/32; B60T 8/60
[52] U.S. Cl. ................................... 303/114.3; 60/545;
60/547.1; 188/356; 303/113.3; 303/113.4;
303/119.2
[58] Field of Search .................. 303/113 TB, 113 TR,
303/113 SS, 114 PN, 118, 119 R, 119 SV, DIG.
3, DIG. 4, 115 VM, 100, 89, 92, 3, 97, 20;
188/356, 357, 353; 60/545, 547.1, 552; 180/273;
91/369.1, 376 R; 251/129.01, 129.02, 129.22

[56] References Cited

U.S. PATENT DOCUMENTS

| | | | |
|---|---|---|---|
| 3,765,172 | 10/1973 | Fineman | 303/20 X |
| 3,795,426 | 3/1974 | Sisson | 303/114 PN |
| 3,827,762 | 8/1974 | Ives | 303/114 PN |
| 4,512,615 | 4/1985 | Kita et al. | 303/114 PN |
| 4,630,706 | 12/1986 | Takayama et al. | 303/114 PN |
| 4,667,471 | 5/1987 | Fulmer et al. | |
| 4,759,255 | 7/1988 | Shimamura | |
| 4,819,996 | 4/1989 | Belart et al. | 188/356 X |
| 4,828,337 | 5/1989 | Wagner et al. | 188/356 X |
| 4,871,215 | 10/1989 | Takayama | 188/356 X |
| 4,875,740 | 10/1989 | Takayama | 303/113 TB |
| 4,966,420 | 10/1990 | Schiel et al. | 188/356 X |

FOREIGN PATENT DOCUMENTS

| | | | |
|---|---|---|---|
| 0379329 | 7/1990 | European Pat. Off. | 303/114 PN |
| 2209091 | 9/1972 | Fed. Rep. of Germany . | |
| 2716471 | 10/1978 | Fed. Rep. of Germany | 303/114 PN |
| 3325854 | 2/1984 | Fed. Rep. of Germany . | |
| 3605295 | 10/1986 | Fed. Rep. of Germany | 303/114 PN |
| 0188746 | 11/1983 | Japan | 303/114 PN |
| 0128043 | 7/1984 | Japan | 303/114 PN |
| 0134048 | 8/1984 | Japan | 303/114 PN |
| 0064057 | 4/1985 | Japan | 303/92 |
| 0064058 | 4/1985 | Japan | 303/114 PN |
| 0078847 | 5/1985 | Japan | 303/114 PN |
| 0166552 | 8/1985 | Japan | 303/114 PN |
| 0202964 | 9/1986 | Japan | 303/114 PN |
| 0180547 | 7/1988 | Japan | 303/114 PN |
| 0171369 | 7/1990 | Japan | 188/356 |

*Primary Examiner*—Douglas C. Butler
*Attorney, Agent, or Firm*—Oblon, Spivak, McClelland, Maier & Neustadt

[57] ABSTRACT

The invention relates to a motor vehicle braking system, comprising a brake pedal (P) to generate brake pressure in an hydraulic fluid, a brake pressure booster (12) operated by differential pressure and adapted to be actuated by a first valve ($V_1$) which is pressurized mechanically by the brake pedal (P), and a first sensor ($S_1$) to detect the pressure generated by the brake pedal. A second sensor ($S_R$, $S_L$) is provided to detect vehicle deceleration or rotational retardation of braked wheel, and a data processing unit serves to compare the data determined by the sensors ($S_1$, $S_R$, $S_L$) and to generate a control signal in response to the result of the comparison for a second valve ($V_2$) which is controllable electrically and by which a pressure difference is adjustable in the brake pressure booster (12).

1 Claim, 2 Drawing Sheets

MOTOR VEHICLE BRAKING SYSTEM

FIELD OF THE INVENTION

The invention relates to a motor vehicle braking system including a brake pressure booster.

BACKGROUND OF THE INVENTION

German patent 33 25 854 discloses a motor vehicle braking system the brake pressure of which is controlled by a brake pressure booster in response to deceleration of the vehicle achieved by braking. This system is intended to make it easier for the driver to meter the brake pressure as he pushes down the brake pedal and, in particular, a certain brake pedal actuation always is to give him the same braking effect no matter how his vehicle is loaded. To accomplish that, the vehicle deceleration is measured and compared with the force exerted on the pedal in conventional manner. When the pedal force applied by the driver brings about a retardation of the vehicle which is less than a given rated value, the brake pressure booster is actuated automatically so that the desired value of vehicle deceleration will be achieved.

In the case of DE 33 25 854 the difference in pressure inside the brake pressure booster is controlled exclusively by a control valve selectively connecting one of the two chambers of the brake pressure booster to a pressure source. If the electrical system should fail (rupture of a cable or the like) the brake pressure booster does not work.

In British patent application 89 18 159, which is not a prior publication, a motor vehicle braking system is specified which has a brake pressure booster integrated in the antilock and in the antislip controls. That brake pressure booster is modified so as not to include a customary mechanical valve for pressurizing the high pressure chamber but instead only an electromagnetic valve system which is controlled by a central processor in response to certain measured values. The values relied upon for measurement especially are the rotational speeds of the wheels (vehicle deceleration), the pedal force, etc. For instance, if a rotational speed sensor for the wheels indicates that they are spinning without the brake pedal being actuated then the control system, acting through operation of the electromagnetic valve, causes the brake pressure booster to become active so as to automatically retard the spinning wheel. Under other circumstances, too, the brake pressure booster is controlled automatically by way of the electromagnetic valve system. For example, the brake pressures generated by the brake pressure booster in response to the force applied on the pedal are measured and "smoothed" in the sense that the most gentle braking will be obtained, without any abrupt onset or termination of the effect of the brake pressure booster. If there is a failure in the electrical system the brake pressure booster fails also with this motor vehicle braking system. This shortcoming is true also of the state of the art according to DE 33 25 854 and DE 22 09 091.

It is known from U.S. Pat. No. 4,667,471 to connect an electromagnetic valve in series with a conventional pedal-operated booster valve. For normal application of the brakes, in this case the control connection between the vacuum chamber and the booster chamber is established by the pedal-operated valve which, however, is backed up by a downstream electromagnet. The brake pressure booster is controlled automatically by the electromagnetic valve so as to facilitate starting up a hill.

U.S. Pat. No. 4,759,255 discloses a low pressure brake pressure booster with which control may be effected either through a pedal-operated mechanical valve or through an electromagnetic valve. In that case, too, the electromagnetic valve is actuated in order to make it easier to start driving the vehicle uphill.

SUMMARY OF THE INVENTION

The invention is aimed at providing a motor vehicle braking system, including a brake pressure booster, which will provide a given vehicle deceleration at a given force exerted by way of the pedal even if the loading states of the vehicle or the conditions of the brakes differ and which, at the same time, is especially reliable to function.

The invention thus provides a motor vehicle braking system which comprises a brake pedal to generate brake pressure in an hydraulic brake fluid, a brake pressure booster responsive to differential pressure and adapted to be actuated by a first valve which is operated mechanically by the brake pedal, and a first sensor to detect the force generated by the brake pedal, at least one second sensor to detect a vehicle deceleration or rotational retardation of braked wheels, and a data processing unit to compare the data determined by the sensors and to generate a control signal in response to the result of the comparison for a second valve which is controllable electrically and by which a pressure difference is adjustable in the brake pressure booster.

The invention thus modifies a motor vehicle braking system with a conventional brake pressure booster by including another superposed control valve, in addition to the known valve which is operated purely mechanically for controlling the pressure difference in the two chambers of the booster. This additional valve is operable independently of the mechanical valve so as to adjust the brake pressure booster in response to parameters which characterize the braking or driving state of the vehicle. These parameters characterizing the braking or driving state of the vehicle especially are the vehicle deceleration and the spinning of wheels.

According to the invention the so-called transmission ratio of the brake pressure booster can be set (controlled) selectively by the electromagnetic valve for supplementary air. The transmission ratio of a brake pressure booster is understood to be the ratio between the input pedal force and the output force generated in the path of force beyond the brake pressure booster and usually introduced directly into a master cylinder so as to produce pressure in the brake circuits of the vehicle for braking.

In a conventional booster which incorporates only one mechanically operable valve, this transmission ratio is predetermined by the geometric and hydraulic conditions. According to the invention, however, the second valve which is controllable electrically is of such nature that it may be relied upon to selectively control the transmission ratio of the brake pressure booster and to increase it beyond the value which is given for the mechanical valve. The second valve will provide a desired transmission ratio when a predetermined rated deceleration of the vehicle is not reached at a certain input pedal force.

In case of failure of the electrical system and thus of the second valve which is operable electrically the mechanically operable valve and thus also the brake pressure booster will remain effective. The electrically operable valve is designed to close upon failure of the power supply such that the brake pressure booster will continue to work in the conventional way.

The parameters to be measured in order to actuate the electromagnetic second valve accordingly specifically are the following:

a) the deceleration of the vehicle as compared to the input pedal force,
b) the loading of the vehicle measured by per se known load sensors,
c) the temperature of the friction linings of the vehicle brakes (if this temperature is too high, i.e. above a predetermined value the brake pressure is not enhanced),
d) the angle of inclination of the vehicle, and
e) the fact whether or not a trailer is coupled to the vehicle, or
f) the transmission ratio provided by means of the second valve is freely adjustable.

In accordance with a modification of the invention it is possible to have the first valve, which is operable mechanically, become effective only if the second valve, which is operable electrically, is not working because of a defect in the electrical system. With this variant of the invention, therefore, only the second valve, the electrically operable one, is active when the electrical system is working, whereas the flow path of the mechanical valve remains closed.

The electrically operable second valve may be used to control the transmission ratio of the brake pressure booster as required by selectively admitting more or less fluid (e.g. air) into the higher pressure chamber of the booster. For example, if there is a "vacuum" in the low pressure chamber of the brake pressure booster, the pressure in the high pressure chamber can be raised in fine doses by means of the electromagnetic inlet valve until a desired transmission ratio is reached. The desired transmission ratio is adjusted in response to at least one of the above mentioned parameters (deceleration achieved at given pedal force, loading of vehicle, angle of inclination, etc.). The instantaneous transmission ratio can be measured by force sensors upstream and downstream of the brake pressure booster.

BRIEF DESCRIPTION OF THE DRAWING

The invention will be described further, by way of example, with reference to the accompanying drawing, in which.

DESCRIPTION OF THE PREFERRED EMBODIMENT

Figure 1:
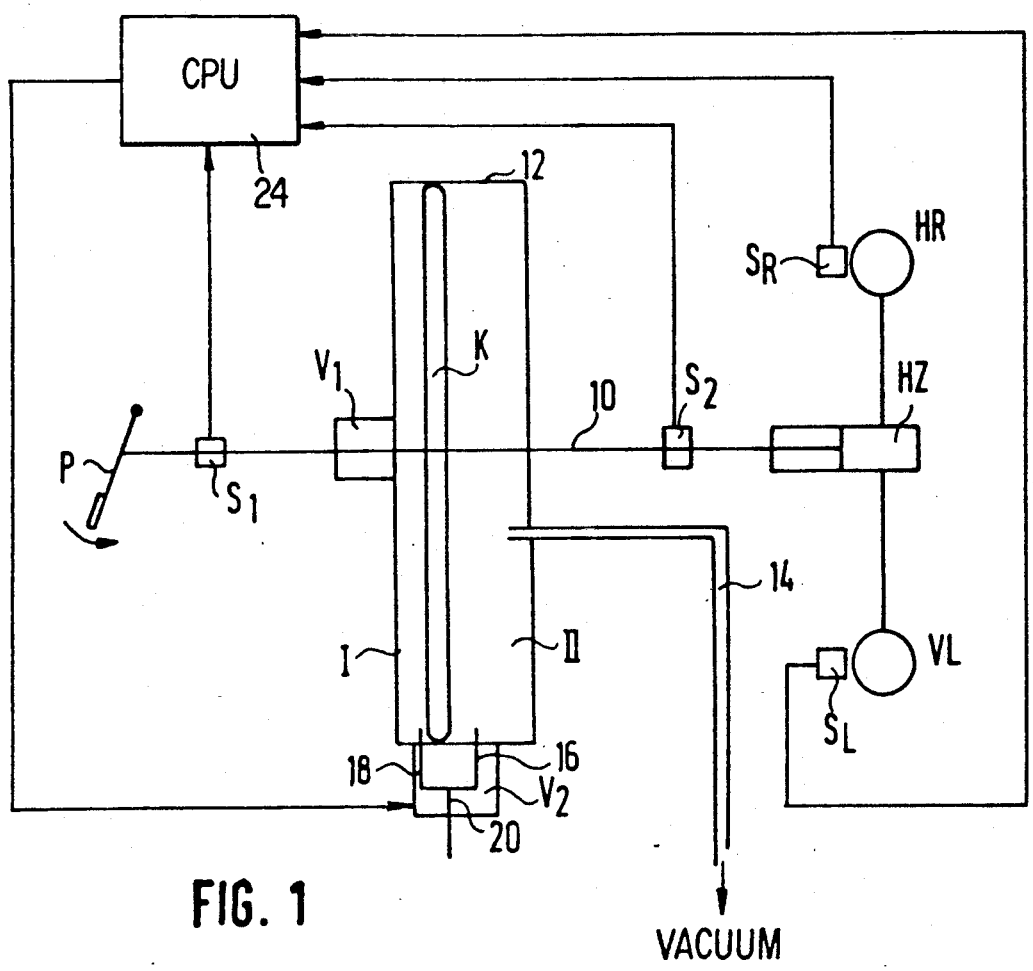
FIG. 1 is a diagrammatic presentation of a motor vehicle braking system including a brake pressure booster.

FIG. 1 is a diagrammatic presentation showing a brake pedal P which is moved in the direction of the arrow in order to apply the brakes. The force generated by the brake pedal is measured by a force sensor $S_1$ Downstream of the force sensor $S_1$, in the path of force 10, there is a brake pressure booster 12 comprising two chambers I, II being variable and fixed pressure chambers, respectively and a plunger K which is displaceable by virtue of a difference in pressure in the chambers, as usual. The brake pressure booster 12 is followed in the path of force 10 by another force sensor $S_2$ which measures the force as increased by the pressure booster 12. The path of force 10 leads into a conventional master cylinder HZ which feeds hydraulic fluid under pressure in per se known manner into brake circuits. FIG. 1 illustrates a brake circuit consisting of a right rear wheel HR and a left front wheel VL. The wheels are equipped with per se known sensors $S_R$ and $S_L$ to detect the respective rotational speeds.

Fixed pressure chamber II of the brake pressure booster 12 communicates in per se known manner through a conduit 14 with a suction means so as to produce vacuum in chamber II.

As shown in fig. 1, two valves $V_1$ and $V_2$ are provided to control the brake pressure booster 12.

Valve $V_1$ is arranged in the path of force 10. It is actuated mechanically when the brake pedal P is pushed down. In this respect the valve $V_1$ may be of known design.

In addition, an electromagnetically actuated valve $V_2$ is provided having three ports; a first port 16 connected to the fixed pressure chamber I of the booster, a second port 18 which is connected to the variable pressure chamber II of the booster, and a third port 20 fixed to a source of high pressure which would be atmosphere where the booster is a vacuum booster, which has two valve paths. One valve path through ports 16, 18 interconnects the two chambers I and II of the brake pressure booster 12, while another valve path through ports 18, 20 connects the variable pressure chamber I to the source of high pressure fluid, such as the outside atmosphere. The two valve paths through ports 16, 18, on the one hand, and 18,20, on the other hand, are switched alternatively, i.e. either the two chambers I, II are interconnected to establish vacuum in both of them, or the connection between the two chambers I, II is interrupted and only chamber I is connected to the ambient atmosphere through the valve ports 18,20. Advantages of valve $V_2$ especially as regards the changeover between the two valve paths will be described in greater detail below.

Figure 2:
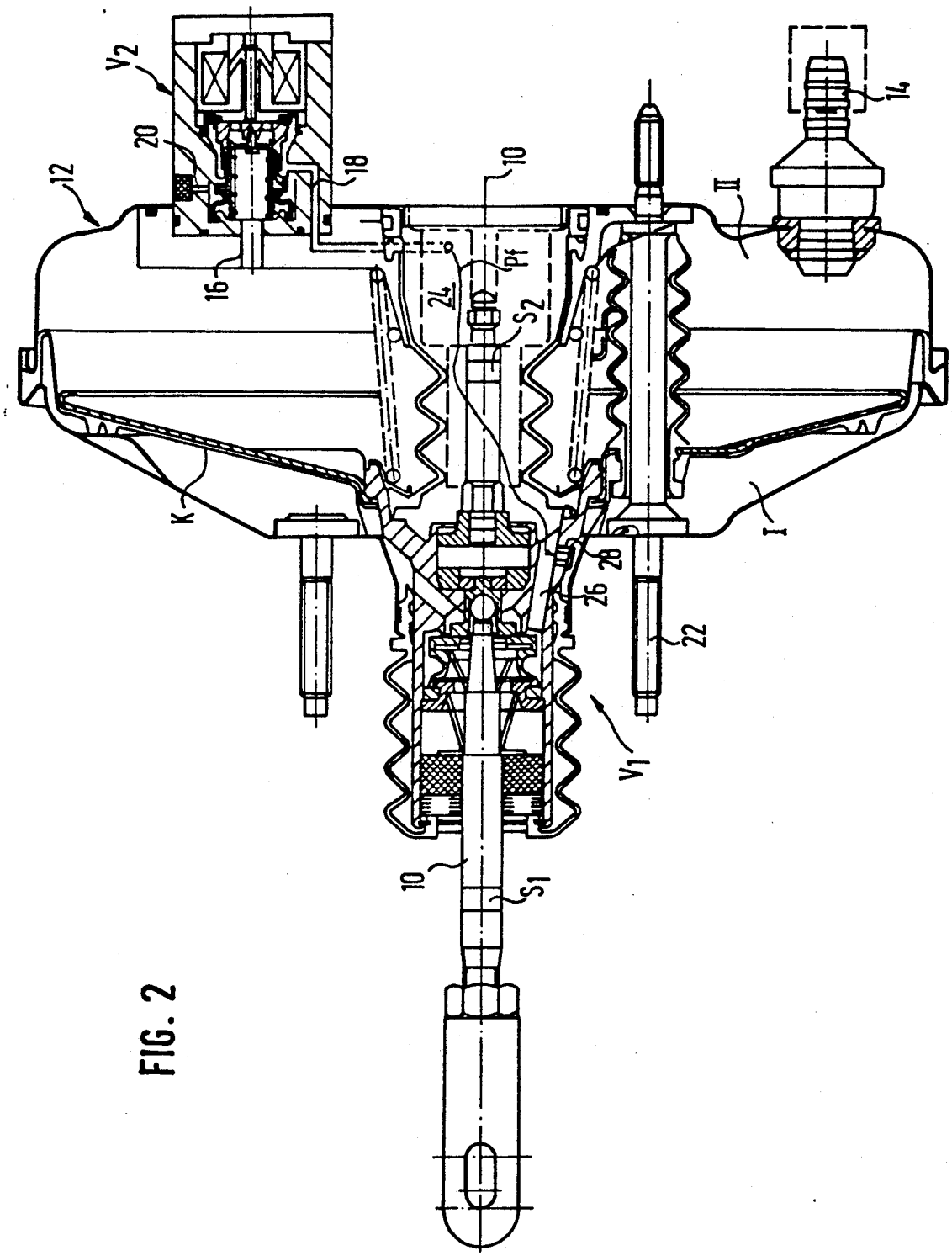
FIG. 2 is a longitudinal sectional view of a brake pressure booster.

FIG. 2 shows an axial section through the brake pressure booster. The brake pressure booster 12 is fixed by a pin 22 e.g. to the dashboard of an engine compartment. Corresponding structural members are marked by the same reference numerals in all the figures. The flow path for admitting high pressure air to the left chamber, I of the brake pressure booster 12 leads through an inlet port 20 into valve $V_2$ and through the outlet port 18 thereof into a central free space 24 in the brake pressure from which it continues into a passage 26 and on through a one-way valve 28 in the direction of arrow Pf into chamber I. Along this way pressurized air can be admitted in fine doses to chamber I by means of the electromagnetically operable valve $V_2$ to realize the selective control of the transmission ratio of the brake pressure booster 12.

To accomplish that, the force sensors $S_1$, $S_2$ measure the forces which are in effect in the path of force 10 in front of and behind the brake pressure booster 12, and corresponding values are entered into a data processing unit 24. Furthermore, the sensors $S_R$, $S_L$ determine the deceleration of the vehicle during brake application. This is known as such from antilock control technology. The data processing unit compares the deceleration of the vehicle resulting from the application of the brakes and establishes a relationship with the input force produced by means of the brake pedal P at the brake pressure booster 12 (force sensor $S_1$).

Figure 3:
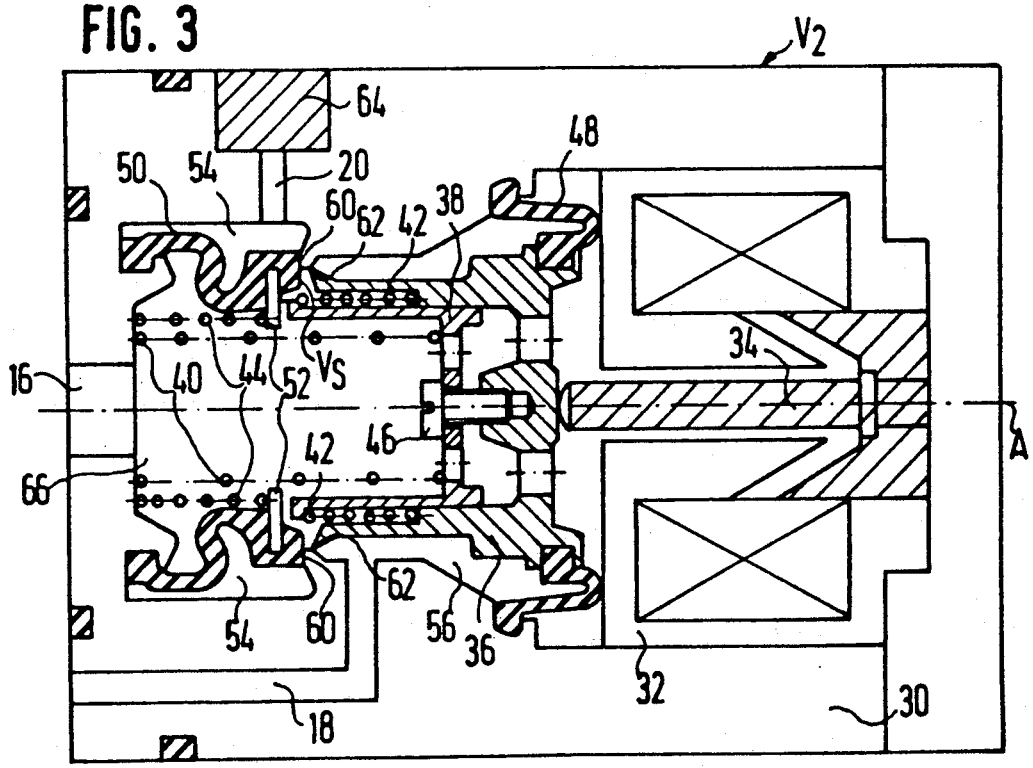
FIG. 3 shows valve $V_2$ of FIG. 2 on an enlarged scale.

FIG. 3 shows details of the valve $V_2$. The task of the connections between ports 16, 18, and 20 of the valve has been described above.

Valve $V_2$ comprises a housing 30 in which there is an electromagnet 32. The armature 34 of the electromagnet 32 is movable axially in conventional manner along the axis A of the valve.

The armature 34 of the electromagnet 32 acts on a plunger 36 of the valve, at the left in FIG. 2, which plunger likewise is movable axially. In the plunger 36 and concentrically with the same, an inner sleeve 38 is arranged likewise for axial displacement within certain limits. A spring 40 urges both the inner sleeve 38 and the plunger 36 to the right in FIG. 2 into the inoperative position illustrated. When this position of rest is established, the ports 16 and 18 of the valve are in fluid communication so that application of the valve in a brake pressure booster as shown in fig. 1 will submit both chambers I, II of the brake pressure booster to suction. The switching of the various paths of the valve will be described below.

Apart from the rather weak spring 40 urging the plunger into inoperative position (aided by an elastic collar 48, if desired), there are two other springs, namely one spring 42 trapped between the plunger 36 and the inner sleeve 38 and another spring 44 coaxial therewith. The force of spring 44 is somewhat greater than that of spring 42. FIG. 3 shows the spring 42 in captive state i.e. the spring pressure is accommodated by the sleeve 38 and passed on by a bolt 46 into the plunger 36.

The bolt 46 serves to guide the inner sleeve 38 inside the plunger 36, permitting axial relative motion between these members.

The collar 48 mentioned above is made of an elastic material and permits axial movement of the plunger 36 of the valve. A cuff 50, likewise made of an elastic material, includes a movable valve element $V_S$ at its face end. Firmly incorporated in the cuff 50 is a steel ring 52 which functions as a stop for the spring 44 and the inner sleeve 38.

A space 54 is left free between the housing 30 and the cuff 50, and a corresponding free space 56 is defined between the plunger 36 and the housing 30 of the valve.

A fixed valve seat ring 60 is formed integrally in the housing 30. In the condition illustrated in FIG. 2 it is engaged by the valve element $V_S$. This engagement of the element ring 60 with the valve seat $V_S$ blocks the port 20 of the valve $V_2$ so that atmospheric air cannot enter the valve.

Furthermore, the plunger 36 is formed at its end surface facing the valve seat $V_S$ with movable seat ring 62 which is not yet in engagement with the valve element in the condition illustrated in FIG. 2.

A filter 64 is positioned upstream of the inlet port 20 of the valve $V_2$.

The valve $V_2$ operates as follows: When at rest, as shown in FIG. 3, both the inlet port 20 and the associated circumferential free space 54 are blocked because the spring 44 presses the valve element $V_S$ by way of the stop 52 to the right against fixed seat ring 60.

With this state of affairs, a flow path extends from the connection 16 of the valve through a free space 66, continuing through a gap between the stop 52 and the inner sleeve 38 as well as another gap between the seat rings 60, 62 and on into the port 18. It should be understood that although FIG. 2 shows the seat rings 60, 62 very closely together, air still can pass between them.

Now, if the electromagnet 32 is actuated its armature 34 will exert pressure on the plunger 36, to the left in FIG. 2. Therefore, the plunger 36 likewise moves to the left. And the inner sleeve 38, too, is moved to the left by the spring 42 until its left end edge hits the stop 52. Thereupon the movement of the inner sleeve 38 is interrupted for the time being because the spring rate of spring 42 for instance is 20% less than the spring rate of spring 44. Preferably the springs 42, 44 are selected so that the pressure of the enclosed spring 42 is from 5 to 25%, preferably from 10 to 25% less than that of the spring 44 which acts from the left on the stop 52.

The electromagnet 32 now continues to push the plunger, 36 to the left in FIG. 2 until the movable valve seat ring 62 of the plunger 36 meets with the valve element $V_S$. As that happens, the movable valve seat ring 62 presses the valve element to the left, against the force presented by the spring 44, so that the valve element $V_S$ is lifted off the fixed valve ring 60 formed at the housing 30.

When the movable valve seat ring 62 of the plunger 36 is sealingly engaged with the valve element $V_S$ the connection 16 of the valve $V_2$ is blocked. On the other hand, when the valve element $V_S$ is lifted off the seat ring 60, as described above, a flow path is established from the inlet port 20 through the free space 54 into other free space 56 and on into the port 18. Pressurized fluid thus may flow from the inlet 20 into the port 18.

The arrangement described of the springs permits the valve to be controlled very accurately with relatively small forces. Specifically, the trapped spring 42 "weakens" the closing effect of the spring 44 just before actuation of the valve. For, when the inner sleeve 38 hits the stop 52, the trapped spring 42 already is exerting pressure on the stop 52 and thus on the valve seat $V_S$. And this pressure is but a few percentage points less than the pressure of the closing spring 44. For this reason, relatively small force is required for actuation of the valve in the particularly critical range of valve movement in which the valve is either opened or closed.

The flow of fluid thus can be controlled very sensitively and very accurately by the valve. The valve permits precise metering and responds practically without delay.

Valve $V_2$ functions to control the brake pressure booster 12 in response to control instructions furnished by the data processing unit 24 which derives control commands from measured parameters resulting from the state of the vehicle or of the brakes, such as the vehicle deceleration resulting from a given input force, the loading state, the temperature in the brakes (measured by a temperature sensor, not shown), and/or the angle of inclination of the vehicle (when travelling or standing on an incline, measured by an angle of inclination sensor, not shown).

Valve $V_2$ work in addition to valve $V_1$, the mechanical valve which is conventional as such. In the case of the mechanical valve $V_1$ a secondary force (servo force) is effective when differential pressure between the chambers I and II moves the plunger K (diaphragm plate) to the right in FIG. 1. Based on the mechanical valve $V_1$ condition, it is determined in conventional manner whether or not there is servo support at the plunger K. If valve $V_1$ is moved forward once from the basic position (as the pedal is actuated) the plunger K moves forward until two seat rings come to lie on a valve seat (basic position). This interaction determines the purely mechanical transmission ratio of the brake pressure booster. Conventionally, it is provided that the mechanical control plunger is at a certain lead in time with respect to the piston rod (until standstill of the brake pedal) so that the pedal must not be pressed down without any servo effect at the beginning of a brake application process.

When the brake pedal comes to a standstill the mechanical valve $V_1$ closes again, as usual, and the servo power available in the brake pressure booster corresponds to the respective difference in pressure between the two chambers I and II. Depending mum atmospheric pressure in chamber I or a lesser pressure.

The invention now provides for selectively changing the transmission ratio as given by the mechanical valve by resorting to the electromagnetically controlled valve $V_2$ and the parameters measured (cf. examples given above). That is realized by having the electromagnetic valve $V_2$ admit more atmospheric into chamber I in order to produce an additional component of the boosting force. Of course, it is a prerequisite that the brake pressure booster has not yet been controlled to its maximum value by the mechanical valve $V_1$, i.e. that full atmospheric pressure does not yet prevail in chamber I.

The embodiment of the invention described above as comprising only one electromagnetic valve $V_2$ can be modified so as to incorporate two electromagnetic valves, one for interrupting the fluid connection between chambers I and II and another one for the controlled admission of supplementary air into chamber I.

A non-return valve in a passage connecting the high pressure chamber I with the low pressure chamber II may open toward the high pressure chamber. That makes it possible to have additional air flow into the high pressure chamber I when the mechanical valve actuated by the brake pedal is in control position.

What is claimed is:

1. A motor vehicle braking system comprising a brake pedal, a booster having opposed variable and fixed pressure chambers, first valve means operable by said brake pedal to supply pressure to said booster, and a first sensor for detecting the force generated by said brake pedal upon movement thereof in a brake applying direction, a second sensor for determining vehicle deceleration by detecting the rotational retardation of at least one wheel, a second electrically operated valve for supplying pressure to said booster, a data processing unit for comparing data determined by said first and second sensors and generating a signal to operate said second valve for adjusting pedal controlled pressure in said booster to provide a predetermined vehicle deceleration commensurate with a detected pedal force, said second valve having a first port connected to the fixed pressure chamber of said booster, a second port connected to the variable pressure chamber of said booster and a third port connected to a source of high pressure fluid, a movable valve element in said second valve, first spring means biasing said movable valve element against a fixed valve seat disconnecting said second and third ports while connecting said first and second ports, a movable valve seat in said valve engageable with said movable valve element to disconnect said first and second ports and then lift said movable valve element from said fixed valve seat to connect said third and second ports, a valve plunger carrying said movable valve seat and which is displaceable, in response to a signal generated by said data processor unit, axially by an electromagnet in a direction which is opposite to the direction in which said movable valve element is biased by said first spring, a second spring carried by said plunger which upon axial movement of said plunger towards said movable valve element, engages and exerts a force on said movable valve element as said movable valve seat is moved into engagement with said movable valve element, said first spring being predetermined stronger than said second spring whereby the force exerted by said movable valve seat on said movable valve element to open the same is lessened by the difference in the forces of the respective springs, and the sensitivity of said second valve is thereby enhanced.

* * * * *